Jan. 24, 1967 T. J. DESBOIS 3,299,561

FISHING TACKLE

Filed Dec. 28, 1965

INVENTOR.
Theodore J. Desbois
BY
Asklan T. Harlan Jr.
ATTORNEY.

United States Patent Office 3,299,561
Patented Jan. 24, 1967

3,299,561
FISHING TACKLE
Theodore J. Desbois, 423 Hyde Park Blvd.,
Niagara Falls, N.Y. 14303
Filed Dec. 28, 1965, Ser. No. 517,012
5 Claims. (Cl. 43—42.09)

This application is in part a continuation of copending application Serial No. 324,135, filed November 15, 1963, now abandoned.

The invention of this application relates to fishing bait and is particularly concerned with lures and means for attaching lures to a line.

It is an object of the present invention to provide artificial lures which are readily attached to or removed from a line.

Another object of the invention is to provide means by which a variety of lures may be readily secured to a line.

A further object of the invention is to provide means by which the type of lure and/or hook used on a line may be quickly changed.

Other objects and advantages of the present invention will be evident from the following description taken in conjunction with the accompanying drawing in which.

Unless it is otherwise indicated, in the following description and the appended claims the term "lure" is intended to include broadly in its meaning all types of artificial lures including—but not limited to—spoons, plugs, flies, and insects, frogs, fish, etc. made of plastic or other suitable material.

Figure 1:
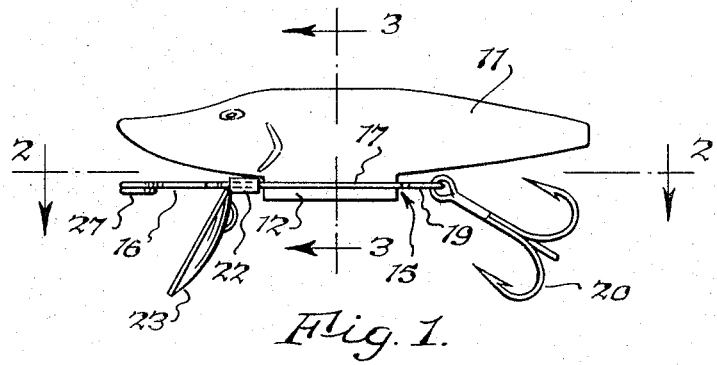
FIGURE 1 is a side elevational view of a bait in accordance with the invention.
Figure 2:
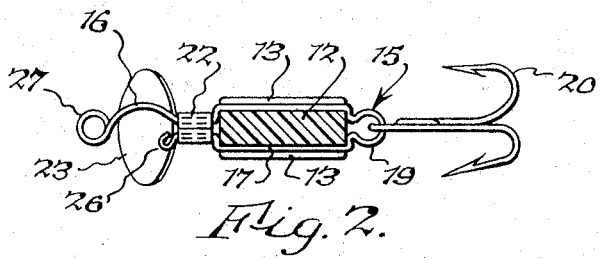
FIGURE 2 is a sectional view on the line 2—2 of FIGURE 1.
Figure 3:
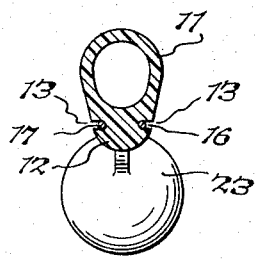
FIGURE 3 is a section view on the line 3—3 of FIGURE 1.

Essentially the present invention is concerned with the provision of fishing tackle which will simplify the changing of lures and will permit more convenient carrying and use of various types of lures. In FIGURES 1 to 3, inclusive, is shown a preferred embodiment of one form of the present invention in which means is provided for removably attaching any of a number of different lures to a lure clip which has, attached thereto, a hook.

Referring to FIGURE 1, the reference character 11 indicates an artificial lure in the form of a plastic fish. The lure 11 is provided on its bottom with an elongated, outwardly extending anchor portion 12. The anchor portion 12 is integral with the body of the lure and is provided along the inner portion of each long side thereof adjacent the main portion or body of the lure with a longitudinal groove 13 parallel to the length of the lure.

A lure clip 15 is used to secure the lure 11 to a line. As seen most clearly in FIGURE 2, the lure clip 15 is preferably formed from a single length of spring wire and comprises a major leg 16 and a minor leg 17 joined by a loop 19 to which a hook 20 is attached. Each of the legs 16 and 17 of the clip 15 is received in one of the opposed grooves 13 on the lure 11 and the free ends of the legs are releasably held together by a flattened collar 22.

The collar 22 is preferably formed integrally with a metal, concavo-convex wobbler 23 and is arranged at such an angle thereto that when the collar encloses the legs of the lure clip 15 the wobbler 23 extends downwardly from the lure 11 and slants forwardly, as seen in FIGURE 1. In use the wobbler causes erratic motion of the lure as it moves through the water thereby simulating the darting movement of a small fish. Preferably an eye is provided on the rear, convex side of the wobbler 23 so that if desired another hook may be attached thereto. As seen best in FIGURE 2, the legs 16 and 17 of the clip 15 are provided with shoulders adjacent their free ends whereby the legs are brought closer together for reception of the flattened collar 22. The free end of the leg 17 is bent laterally in a loop 26 outwardly of the collar 22 thereby restraining the collar against accidental removal. The outer end of the major leg 16 is formed with a laterally outward curve at a point approximately opposite the loop 26 and terminates in a ring 27 preferably formed of at least two convolutions. The ring 27 is in line with the longitudinal axis of the lure 11 when the clip 15 is in place on the lure. As a result when a fishing line (not shown) is attached to the ring 27 the pull on the lure is balanced.

Figure 6:
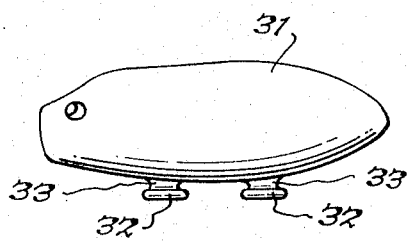
FIGURE 6 is a side elevational view of a modified form of the embodiment illustrated in FIGURES 1-3, inclusive.

It will be understood that the design of the lure 11 may be varied as desired and the lure may be formed to represent various kinds of natural bait as well as other shapes. Further, if desired the lure may be provided with different means for attachment to a lure clip. Thus, as shown in FIGURE 6, a lure 31 for cooperation with the lure clip 15 may be provided with anchor means in the form of a plurality of integral, downwardly projecting buttons 32 each of which has a groove 33. It is readily seen that clip 15 can be releasably fastened to the lure 31 in substantially the same way as to the lure 11. The legs 16 and 17 of the clip will be received in the grooves or reduced neck portions of the buttons 32.

Figure 4:
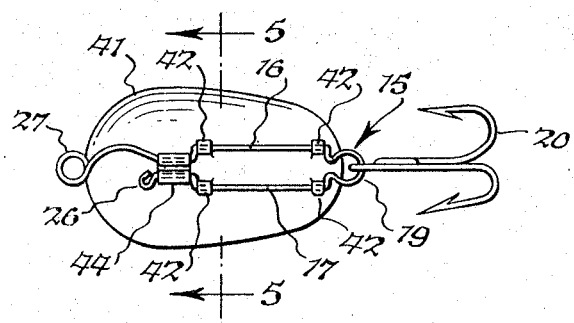
FIGURE 4 is a bottom view of another embodiment of the invention.
Figure 5:
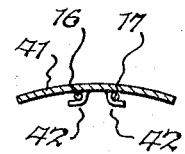
FIGURE 5 is a section view on line 5—5 of FIGURE 4.

FIGURE 4 illustrates the invention of the present application as applied to a spoon or similar type of lures. In FIGURE 4 there is shown a concavo-convex spoon 41 of a common type which has been modified to be used with a lure clip according to the invention. The modifications comprise the provision of pairs of prongs or fingers 42 punched from and extending outwardly from the spoon body. As will be seen in FIGURE 4 the pairs of fingers are spaced longitudinally of the spoon body and the fingers of each pair are aligned transversely of the spoon body. At their outer ends the fingers 42 are bent to extend laterally outwardly thereby forming opposed grooves.

The fingers 42 constitute means for securing a lure clip 15 to the spoon 41. As with the lure 11, a hook of suitable design is engaged in the loop 19 of the clip. The legs 16 and 17 of the clip 15 are placed outside the prongs or fingers 42 in the grooves and are releasable fastened together adjacent their free ends by means of a collar 44. The removable collar 44 may be, as shown, substantially like the collar 22 in FIGURES 1 and 2 and it engages the legs 16 and 17 of the lure clip in the same way to prevent accidental opening of the clip and loss of the lure.

It will be evident from the foregoing description of the invention that it provides an opportunity for a fisherman to carry and use a wide selection of lures of various types without the hooks that are normally secured to the lures becoming entangled. It also provides a way for speedily and conveniently exchanging one lure for another without having to refasten the line to the lure. While it is at times desirable to have several groups of lures, classified by size, and a different lure clip may be necessary to accommodate each size, within each size class the possible variety and number of different lures that may be used is extremely large. Since with any lure there can be used any desired type of hook, single or multiple, weedless or plain, the possible combinations are almost endless. Obviously, to carry separate, permanent combinations of lure and hooks in such number would be impossible.

In using the novel fishing tackle described it is merely necessary to select a lure of proper size, place the anchor means thereof between the legs of the lure clip with the legs engaging in the grooves, bring the free ends of the legs together and slide the collar over the loop 26. To change a lure, the collar is disengaged from the clip by twisting it so as to pass over the loop 26, then the lure can be removed and another substituted. There is no need to remove the line from the lure clip nor need the hook or hooks be disturbed unless it is desired to change them. As will be evident, all of the strain on the assembly is carried by the lure clip. Accordingly it is not necessary that the bodies of the lures be particularly strong thus permitting a wider choice of material and construction for the lures.

While specific embodiments of the invention have been shown and described for illustrative purposes it will be understood that many variations and modifications thereof may be employed without departing from the invention. It is not intended, therefore, that the invention shall be considered as limited to the exact construction illustrated.

I claim:

1. A fishing device comprising in combination a lure, said lure having downwardly projecting anchor means of a length materially less than the length of said lure and provided with opposed grooves lying in a horizontal plane; and separate means adapted to be attached to a line for holding said lure, said separate means comprising a clip having a pair of longitudinally extending legs engaging in said grooves, means for releasably retaining said legs engaged in said grooves, and means for attachment of a hook; said lure being removable from and replaceable in said clip without removing the line or said hook from said separate means.

2. A fishing device as defined in claim 1 in which said means for releasably retaining said legs includes a removable collar.

3. A fishing device as defined in claim 2 in which said removable collar surrounds the free ends of said legs.

4. A fishing device as defined in claim 2 in which said removable collar forms a portion of a wobbler.

5. A fishing device as defined in claim 1 in which said anchor means is integral with said lure.

References Cited by the Examiner

UNITED STATES PATENTS

| 681,308 | 8/1901 | Geen | 43—42.04 |
| 2,228,591 | 1/1941 | Brown | 43—42.09 |
| 2,517,157 | 8/1950 | Adams | 43—42.08 |
| 2,575,626 | 11/1951 | Isaac | 43—42.08 |

FOREIGN PATENTS

| 476,966 | 9/1951 | Canada. |
| 16,438 | of 1908 | Great Britain. |

SAMUEL KOREN, *Primary Examiner.*

D. J. LEACH, *Assistant Examiner.*